United States Patent
Allen et al.

(10) Patent No.: US 8,001,091 B2
(45) Date of Patent: Aug. 16, 2011

(54) APPARATUS, SYSTEM, AND METHOD FOR HIERARCHICAL ROLLBACK OF BUSINESS OPERATIONS

(75) Inventors: Corville O. Allen, Morrisville, NC (US); Gopalakrishnan Balasubramanian, Sunnyvale, CA (US); Travis E. Nelson, Campbell, CA (US); Anupama Sathuluri, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 11/847,313

(22) Filed: Aug. 29, 2007

(65) Prior Publication Data

US 2009/0063580 A1    Mar. 5, 2009

(51) Int. Cl.
    *G06F 17/00*    (2006.01)
(52) U.S. Cl. .................................................. 707/684
(58) Field of Classification Search .............. 707/684
    See application file for complete search history.

(56) References Cited

U.S. PATENT DOCUMENTS

| | | | | |
|---|---|---|---|---|
| 5,553,279 A * | 9/1996 | Goldring | ...................... | 707/615 |
| 6,185,577 B1 * | 2/2001 | Nainani et al. | ...................... | 1/1 |
| 6,523,134 B2 | 2/2003 | Korenshtein | ...................... | 714/16 |
| 6,543,006 B1 | 4/2003 | Zundel et al. | ...................... | 714/19 |
| 6,618,851 B1 | 9/2003 | Zundel et al. | ...................... | 717/3 |
| 6,671,875 B1 | 12/2003 | Lindsey et al. | ...................... | 717/129 |
| 6,769,074 B2 | 7/2004 | Vaitzblit | ...................... | 714/16 |
| 6,961,865 B1 | 11/2005 | Ganesh et al. | ...................... | 714/2 |
| 7,036,044 B1 * | 4/2006 | Verma et al. | ...................... | 714/19 |
| 7,076,488 B2 | 7/2006 | Bollich | ...................... | 707/10 |
| 7,478,342 B1 * | 1/2009 | Philbrick et al. | ...................... | 715/809 |
| 2001/0044792 A1 * | 11/2001 | Kikuchi et al. | ...................... | 707/3 |
| 2001/0049714 A1 * | 12/2001 | Kikuchi | ...................... | 709/201 |
| 2003/0050972 A1 | 3/2003 | Felt et al. | ...................... | 709/203 |
| 2003/0126159 A1 | 7/2003 | Nwafor | ...................... | 707/200 |
| 2005/0086648 A1 | 4/2005 | Andrews et al. | ...................... | 717/135 |
| 2005/0114409 A1 * | 5/2005 | Sinha et al. | ...................... | 707/203 |
| 2006/0230311 A1 | 10/2006 | Kao et al. | ...................... | 714/16 |
| 2008/0098045 A1 * | 4/2008 | Radhakrishnan et al. | .... | 707/203 |

OTHER PUBLICATIONS

Kathpalia S.R.; "Managing IT Assets Across Enterprise Networks", IEEE Presentation, Aug. 21, 2003.

* cited by examiner

*Primary Examiner* — Wilson Lee
*Assistant Examiner* — Michael Le
(74) *Attorney, Agent, or Firm* — Kunzler Needham Massey & Thorpe

(57) ABSTRACT

An apparatus, system, computer program product and method are disclosed for the hierarchical rollback of business objects on a datastore. The hierarchical rollback method utilizes a non-linear process designed to restore data to a previous point in the case of a data modification failure in order to prevent incorrect linking and data corruption. The hierarchical rollback methods are generated by retrieving existing data and creating commands in an order that will prevent orphan data in a datastore.

19 Claims, 7 Drawing Sheets

APPARATUS, SYSTEM, AND METHOD FOR HIERARCHICAL ROLLBACK OF BUSINESS OPERATIONS

BACKGROUND OF THE INVENTION

1. Field of the Invention

The invention relates to means and methods for recovering from failed execution of a command on a data server. Specifically, the invention relates to devices, methods, and systems for hierarchically rolling back data on a data server.

2. Description of the Related Art

Data storage systems are deployed in a wide variety of enterprises and applications. Enterprise Information Systems (EIS) are data storage systems specifically designed to store business objects containing hierarchical data relationships that define various elements of business entities. Enterprise Information Systems may possess constraints that limit how links and relationships are created within a data store.

A transaction is an indivisible set of operations forming a logical unit of work to be executed in such an enterprise information system. A transaction must be entirely completed or not at all. In some cases, a set of operations is not bound by the constraints of a transaction. A non-transactional set of operations presents challenges not found with transactional operations.

For example, a failed non-transactional set of operations may result in extraneous, incorrect, or orphan data with no true business entity representation. Because a non-transactional set of operations does not have a predefined order, a rollback order may not be easily established. Current communication interfaces for Enterprise Information Systems are not capable of removing the extraneous data in the case of non-transactional business objects, and consequently may leave incorrectly linked data in the data store. Furthermore, the incorrect links and data that remain can corrupt the integrity of a data store.

SUMMARY OF THE INVENTION

The present invention has been developed in response to the present state of the art, and in particular, in response to the problems and needs in the art that have not yet been fully solved by currently available enterprise server rollback means and methods. Accordingly, the present invention has been developed to provide an apparatus, system, computer program product, and method for hierarchically rolling back operations that overcome many or all of the above-discussed shortcomings in the art.

The apparatus to hierarchically rollback business objects is provided in certain embodiments with a plurality of modules configured to functionally execute the necessary steps of the rollback process. In one embodiment, the apparatus includes an update module that receives non-transactional modification requests for business objects and a rollback module that generates a rollback procedure for each data element in the modification request. The modification requests may include multiple change, delete, and update commands for data elements that are related by parent-child relationships within the business object.

The update module may conduct the delete, update, or change requests for the data elements specified in the modification request. In certain embodiments, the rollback module hierarchically conducts the generated rollback procedures when an execution failure is detected for any of the delete, update, or change commands specified in the modification request.

The rollback module may be configured to perform cascade execution of generated rollback procedures and execute the rollback procedures in a non-linear order. The apparatus may also include a retrieval module that can access a data store and activity log that records the execution of the delete, update, or change requests executed on a data store. The activity log may also record execution of the rollback procedure.

The hierarchical rollback apparatus in the present invention provides a significant advantage over prior art by enabling the generation of rollback procedures when the procedures are non-transactional. In other words, when there are no isolation guarantees of command execution, the present invention is able to generate distinct rollback procedures to undo a part of a series of command executions. Furthermore, the present invention overcomes issues of non-restricted data relationships within a business object.

A computer program product and corresponding method comprising a plurality of executable operations is also presented for hierarchically rolling back business objects on a data store when a business object modification operation fails. In one embodiment, the executable operations include receiving a modification request for a business object and generating a rollback procedure for each data element in the request. The modification request may include a variety of delete, update, or change requests for data elements that are related by parent-child relationships.

The executable operations may also include conducting a plurality of delete, update, or change requests for the data elements specified in the modification request. The executable operations may further include hierarchically conducting the generated rollback procedures for the data elements in the modification request in response to an execution failure. The execution of the rollback procedures may entail conducting logical operations.

In one embodiment, the rollback procedure is performed by cascade execution and may be executed in a non-linear order by the software medium. An activity log may be used to record the execution of delete, update, or change requests specified in the modification request, as well as rollback procedures.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
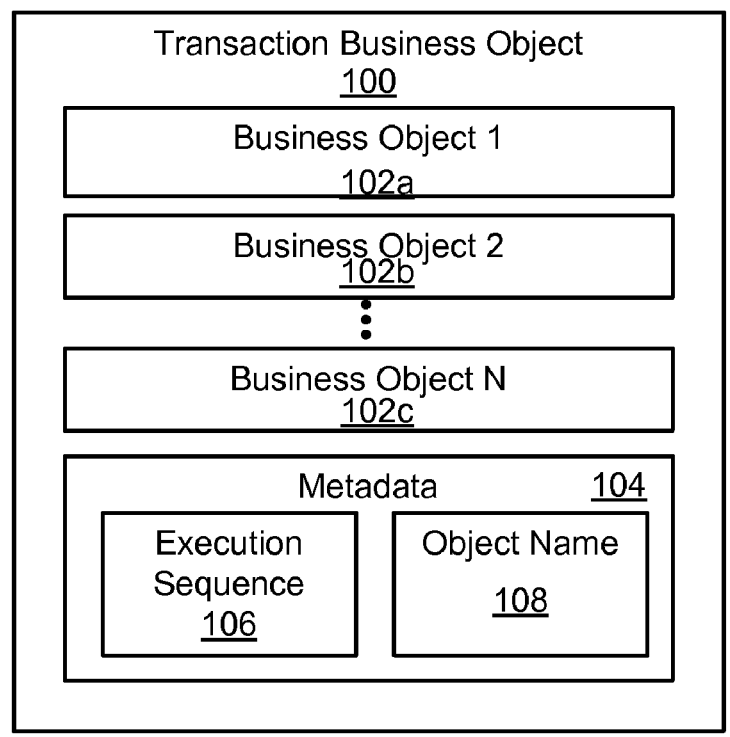
FIG. 1 is a block diagram depicting one embodiment of a transactional business object.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to computer readable medium may take any form capable of causing execution of a program of machine-readable instructions on a digital processing apparatus. For example, a computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram depicting a prior art transaction business object 100. The transaction business object 100 may be used to encapsulate business objects 102*a-c* corresponding to one or more function calls and may contain actual data. The transaction business object 100 may also include metadata 104 containing application-specific instructions for processing the transaction business object 100. This metadata 104 may include an execution sequence 106. The depicted transaction business object 100 in FIG. 1 is an example of a series of executions combined to form a complete execution instruction within a strict set of transactional guidelines.

In certain embodiments, the metadata 104 may include information corresponding to the execution sequence 106 of the function calls. The execution sequence 106 defines the order for executing an action associated with each encapsulated business object 102*a-c*.

Objects without metadata or the relationships shown in FIG. 1 do not have execution isolation guarantees such as the guarantees provided by transaction business objects 100. Furthermore, an execution sequence may not be established. The present invention addresses the need for rollback processes when there is no set sequence or relationship.

The present invention enables the rollback of business objects without having any metadata 104 or knowledge of the predefined execution sequence 106. By generating a hierarchical order containing distinct procedures based on the command framework in the business object, the present invention can recover from part of a failed series of executions, even in the case of a non-transactional business object.

Figure 2:
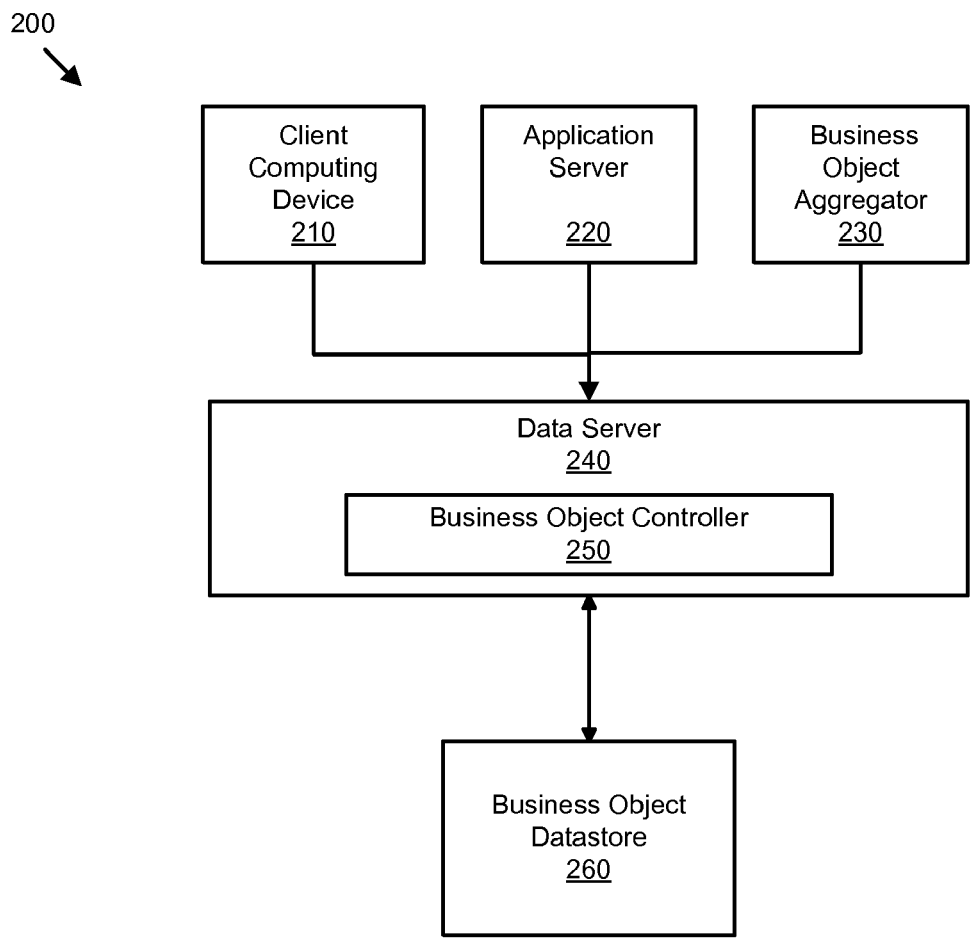
FIG. 2 is a block diagram depicting one embodiment of a business object processing system in accordance with the present invention.

FIG. 2 is a block diagram depicting one embodiment of a business object processing system 200 in accordance with the present invention. As depicted, the business object processing system 200 includes a client computing device 210, an application server 220, and a business object aggregator 230. The depicted business object processing system 200 also includes a data server 240, a business object controller 250, and a business object data store 260. The business object processing system 200 enables robust data modifications to the data housed in the business object data store 260.

The client computing device 210 and other computing devices such as the application server 220 and the business object aggregator 230 are used to generate and transmit business objects to the data server 240. A business object may be a block of data or a programmatically generated object that is modeled after a business concept, such as a person, place, event, or process. A business object, in some embodiments, may include data and commands. The data server 240 is specifically configured to receive business objects and utilize a business object controller 250 to coordinate the update, insert, and delete operations on the business object data store 210 as those commands are defined in the business object.

The business object controller 250 may also be configured to retrieve data from the business object data store 260 and deliver the data to the data server 240 for use in a subsequent process or query. In one embodiment, the data server 240 can then manipulate and transmit the retrieved data to the client computing device 210, the application server 220, or the business object aggregator 230.

Figure 3:
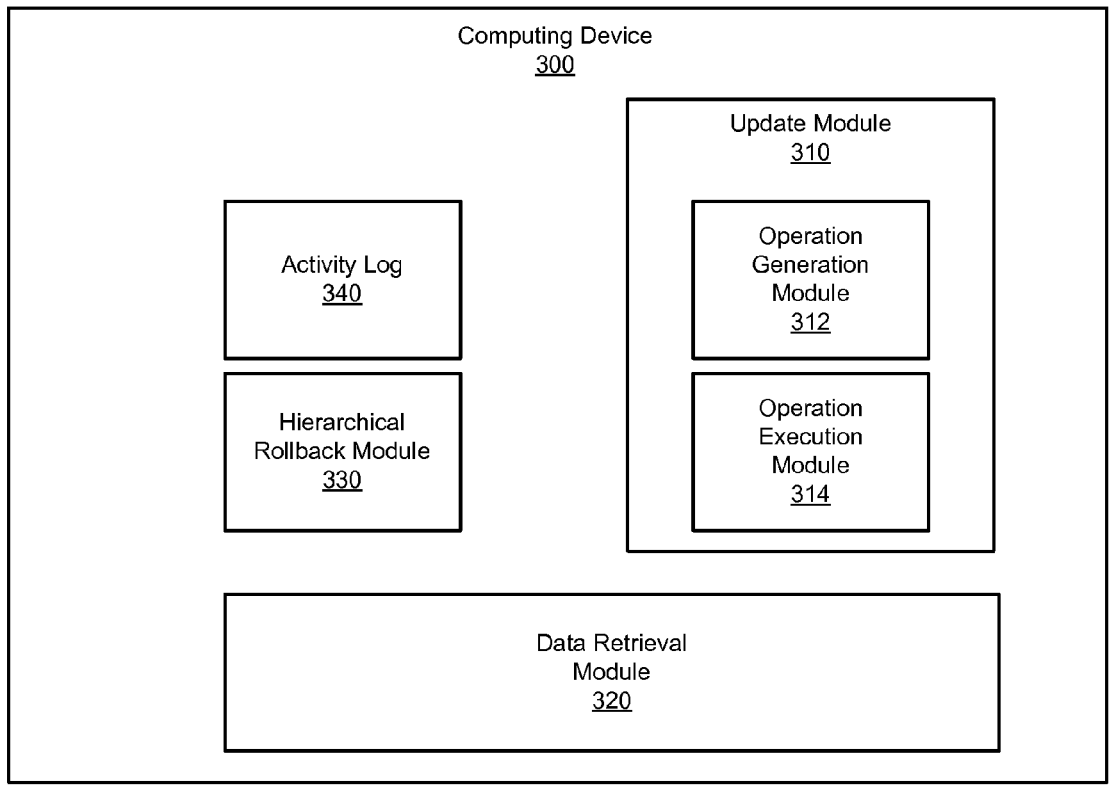
FIG. 3 is a block diagram depicting one embodiment of a business object controller in accordance with the present invention.

FIG. 3 is a block diagram of a computing device 300 in accordance with the present invention. As shown, the business object controller comprises an update module 310, operation generation module 312, operation execution module 314, data retrieval module 320, hierarchical rollback module 330, and an activity log module 340. The computing device 300 enables business objects to modify a datastore while providing a way to undo the modifications and record failures.

In one embodiment, the update module 310 contains an operation generation module 312 and an operation execution module 314. The operation generation module 312 may be configured to generate operations on business objects, where operations may include insert, delete, or update queries pertaining to data in the business objects. The operation execution module 314 executes operations defined by the operation generation module 312.

The data retrieval module 320 retrieves data affected by the operations generated by the operation generation module 312. The data retrieval module 320 may be specifically configured to retrieve data in a non-linear order. By retrieving data based on the command pattern framework instead of a linear order, the data retrieval module 320 may create a hierarchical structure of the retrieved data that corresponds to a rollback command framework. Structuring data in a hierarchical pattern enables more efficient data access when rollback procedures are implemented. The data retrieval module 320 transfers the retrieved data to the hierarchical rollback module 330.

The hierarchical rollback module 330 generates a hierarchically organized set of rollback commands. A rollback command is a set of operations to undo the operations generated by the operation generation module 312. The hierarchical rollback module 330 may also be responsible for temporarily storing generated rollback commands for use in a subsequent rollback sequence.

The activity log 340 records the actions performed by the operation execution module 314 and the hierarchical rollback module 330. The activity log 340 may be specifically configured to record failures in the operation generation module 312 and the operation execution module 314.

Figure 4:
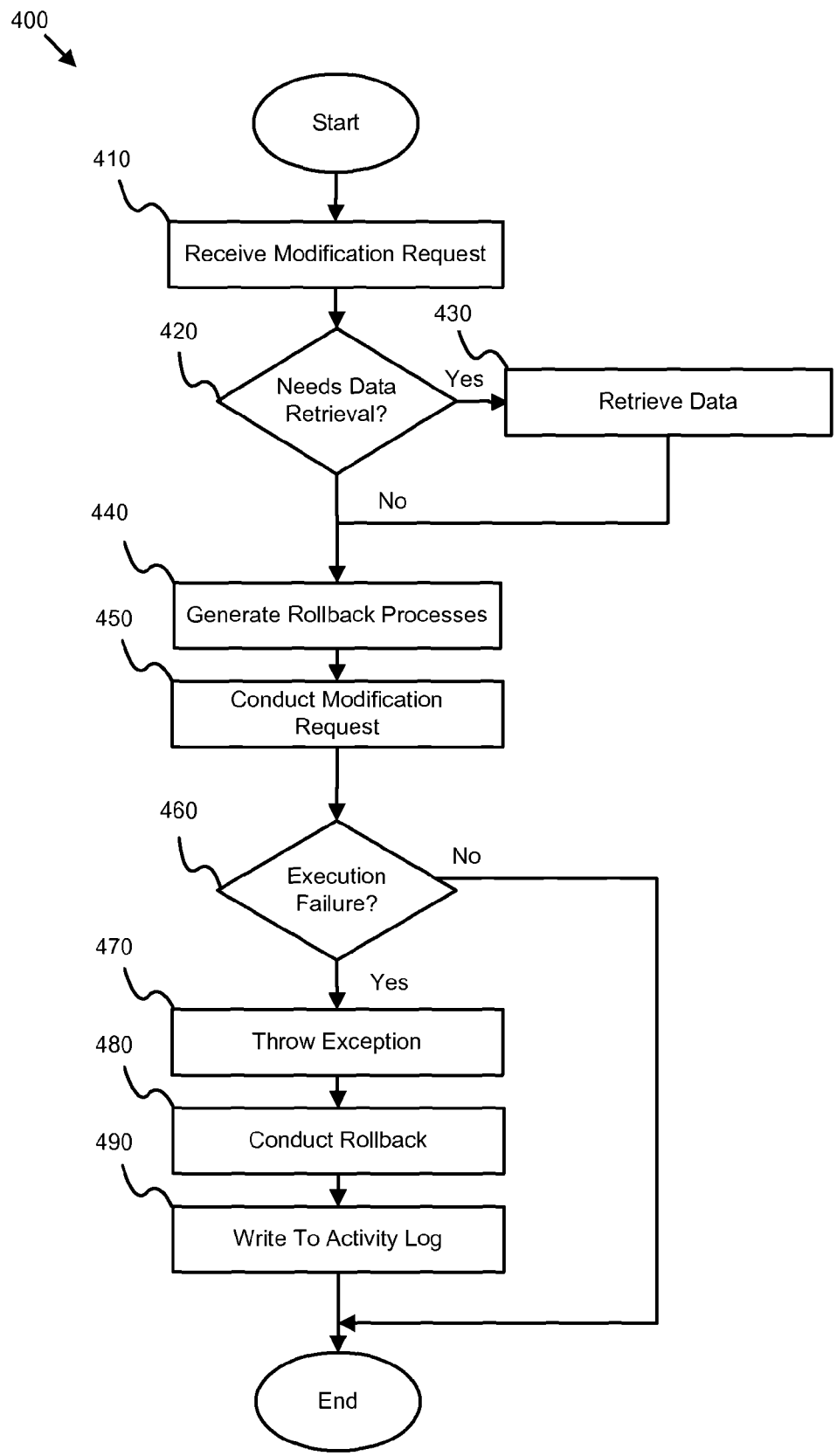
FIG. 4 is a schematic flow chart diagram illustrating one embodiment of a business object rollback method where hierarchical rollback procedures and logs are generated in accordance with the present invention.

FIG. 4 is a flow chart depicting one embodiment of a business object rollback method 400. As depicted, the rollback method 400 includes receiving 410 a modification request 440, determining 420 if data needs to be retrieved, retrieving data 430, generating 440 rollback procedures, conducting 450 modification requests, and determining 460 if there is an execution failure. The rollback method 400 may also include throwing 470 an exception, conducting 480 one or more rollback operations, and writing 490 to an activity log. The rollback method 400 generates undo operations, or rollback operations that are executed in response to an execution failure. The rollback method 400 is presented herein from the perspective of a program executing on a particular data server that may be in communication with a storage server or the like.

Receiving 410 a modification request may include receiving data packets and commands to insert, delete, or update data on a data store. Determining 420 if data needs to be retrieved may involve examining the received modification request for update and delete instructions. Since update instructions overwrite the existing data state, a copy of the data state before modification may be necessary. Likewise, if the modification request includes delete instructions, pre-existing data will be altered and may need to be stored prior to modification. On the other hand, an insert command does not modify any pre-existing data state, so data may not be retrieved. Existing data may be retrieved 330 and used to generate rollback procedures in cases where data retrieval is required.

Generating 440 rollback procedures may include generating hierarchically structured insert, delete, or update statements to be subsequently executed, where the hierarchically structured commands are specifically configured to undo, or rollback, the commands in the received modification request 410. By configuring each rollback command independently, the failure of part of a series of operations may be undone without having to execute all rollback commands. Only the rollback commands specific to the failure are implemented in the case of a partial failure.

The method 400 proceeds by conducting 450 the modification request and testing 460 for an execution failure. If there is an execution failure during the processing of the modification, the method 400 may then proceed by conducting 480 the rollback procedures generated in step 440 to restore the data to a previous state. Information regarding the execution failure 460 of the modification request, the resulting exceptions and the conducted rollbacks may be written 490 to an activity log.

Figure 5:
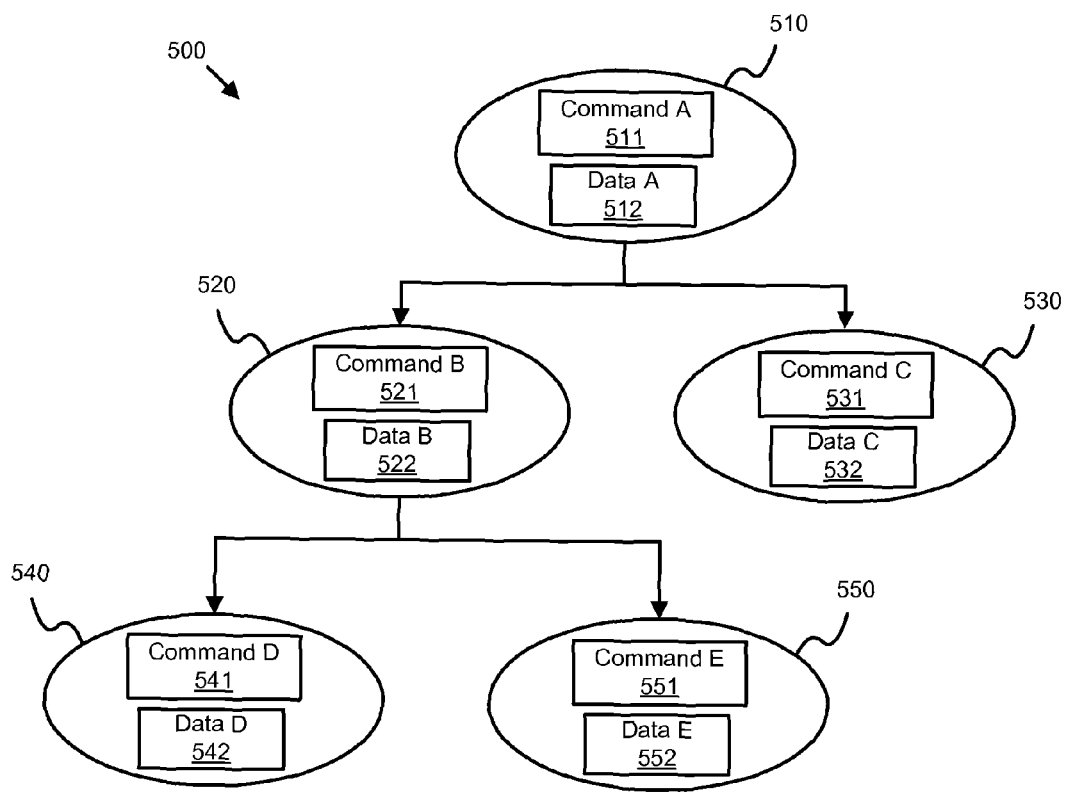
FIGS. 5-7 are data diagrams depicting an example of the generation and implementation of rollback procedures in accordance with the present invention.

FIG. 5 illustrates one particular example of a typical hierarchical business object 500, consisting of a hierarchical set of data and commands. As depicted, the hierarchical business object includes Object A 510 with Command A 511 and Data A 512, Object B 520 with Command B 521 and Data B 522, Object C 530 with Command C 531 and Data C 532, Object D 540 with Command D 541 and Data D 542, and Object E 550 with Command E 551 and Data E 552. The hierarchical business object 500 shown in FIG. 5 is a typical input to an enterprise business system and includes both the commands and data necessary to store data or modify a business object within a datastore.

Object A 510 may be construed as the root of the business object and may contain Data A 512, the data used by Command A 511 to modify a datastore. Specifically, in cases where Command A 511 is of the form of an insert or update command, Data A 512 may be necessary to provide data for update or insertion commands. Object A 510 may also contains references to the children objects Object B 520 and Object C 530. The child Command B 521 and child Command C 531 may be executed before or after Command A 511, depending on the data contained in Data A 512, Data B 522, and Data C 532. In certain cases, such as delete commands, Data A 512, Data B 522, and Data C 532, may not be required or may be empty.

A plurality of second level Objects such as Object B 520 and Object C 530 may be associated with the parent Object A 510. The second level Object B 520 and Object C 530 may have a plurality of references to grandchildren or third level commands relative to the root Object A 510. The hierarchical business object 500 may have multiple levels and is not constrained to three tiers. In the depicted example, the second level Object B 520 contains references to Object D 540 and Object E 550.

Figure 6:
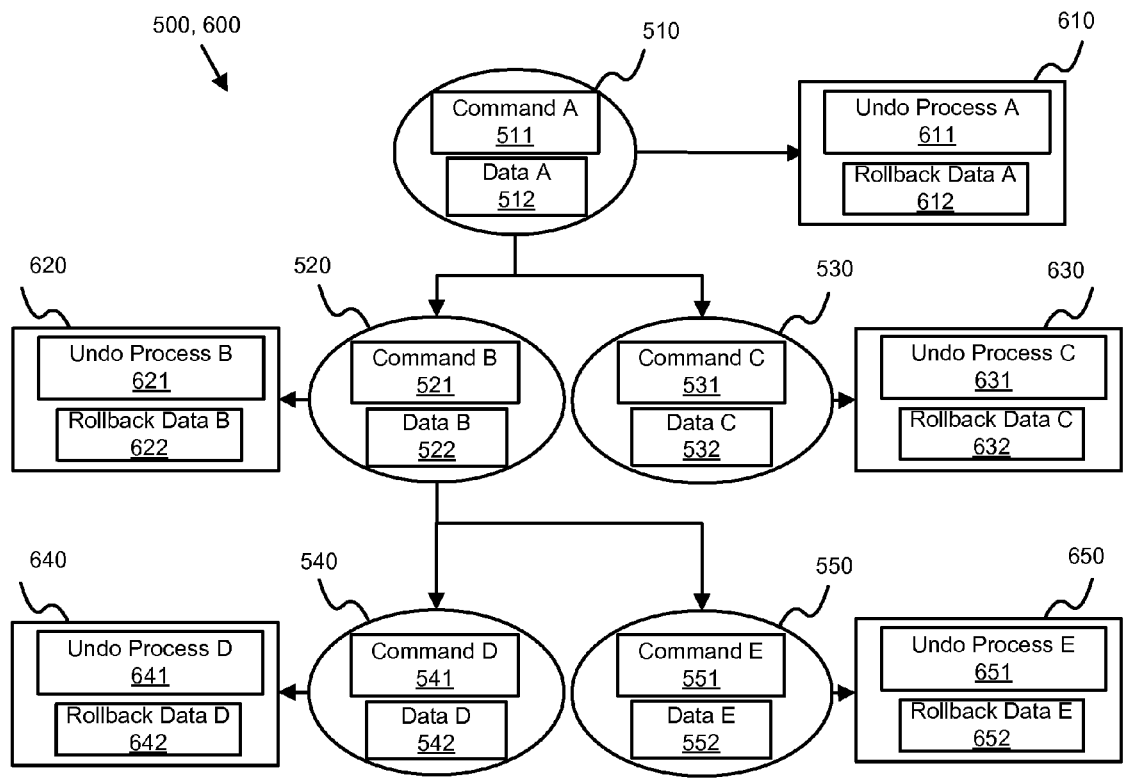

FIG. 6 illustrates the hierarchical business object 500 with generated rollback objects 600. As depicted, the generated rollback objects include Rollback Object A 610, Rollback Object B 620, Rollback Object C 630, Rollback Object D 640, and Rollback Object E 650. The generated rollback objects 600 are examples of the rollback data and undo commands necessary to rollback the operations defined by the hierarchical business object 500 in the case of an execution failure.

Command A 511 may be used to generate an Undo Process A 611. In one embodiment, Command A 511 and Data A 512 may also be used by the present invention to define Rollback Data A 612. In one embodiment, Rollback Data A 612 contains the state of data prior to the execution of Command A 511 and also stores the data for subsequent use by the Undo Process A 611. A Command A operation such as delete, for example, may be undone by an insert query executed by Undo Process A 611 where the data is defined by Rollback Data A 612. In another example, a Command A 511 operation such as insert may be rolled back by a delete command executed by Undo Process A 611. Rollback Data A 612 may be undefined in situations where Undo Process A 611 contains delete commands or other commands not requiring previous state data.

Similarly, Command B 521 and Command C 531 may be used to generate Rollback Data B 622 and Rollback Data C 632 as well as Undo Process B 621 and Undo Process C 631 for use in case of an execution failure of Command B 521 or Command C 531. Command D 541 and Command E 551 may be similarly used to generate Undo Process D 641 and Undo Process E 651 and corresponding Rollback Data D 642 and Rollback Data E 652. The hierarchical business object 500 and generated rollback objects 600 may be extended to include more nodes than the present depiction.

Figure 7:
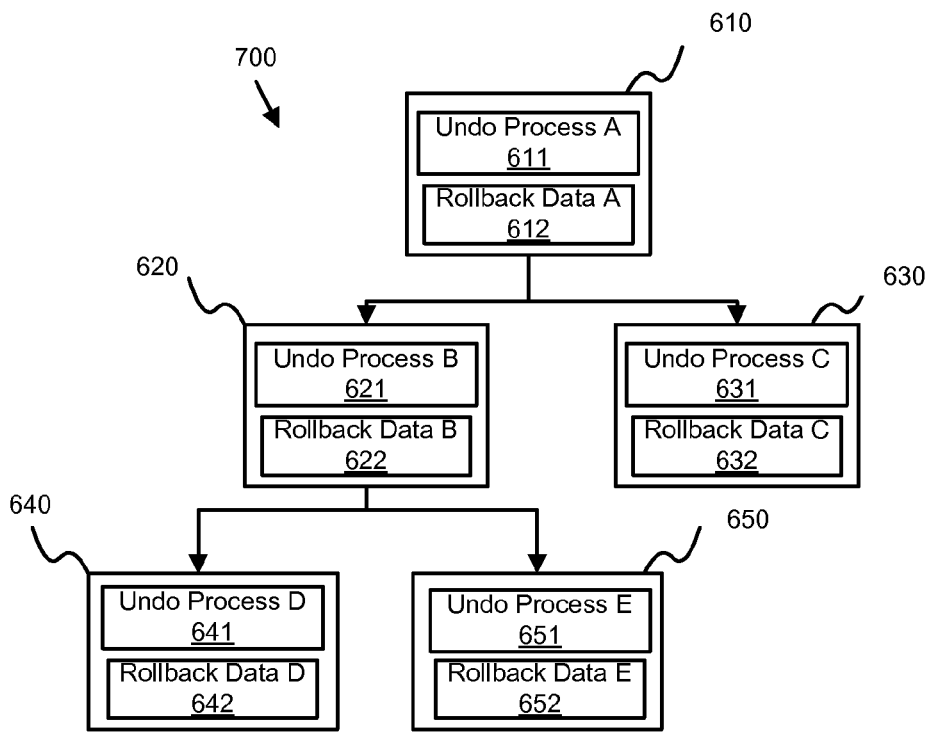

FIG. 7 illustrates a generated hierarchical rollback object 700. As depicted, the hierarchical rollback object includes a Rollback Object A 610 with, Undo Process A 611 and Rollback Data A 612, Rollback Object B 620 with Undo Process B 621 and Rollback Data B 622, Rollback Object C 630 with Undo Process C 631 and Rollback Data C 632, Rollback Object D 640 with Undo Process D 641 and Rollback Data D 642, and Rollback Object E 650 with Undo Process E 651 and Rollback Data E 652. The generated hierarchical business object 700 is a business object generated by the present invention in order to recover or rollback from an execution failure on the part of an original business object.

Rollback Object A 610 may be the root of the hierarchical rollback object 700 and includes Undo Process A 611 and Rollback Data A 612. Undo Process A 611 may utilize Rollback Data A 612 in cases where a rollback command requires data from a previous state. Rollback Object B 620 and Rollback Object C 630 may contain links to the parent object, Rollback Object A 610. Similarly, Rollback Object D 640 and Rollback Object E 650 may contain links to the parent node Undo Process B 621.

Undo Process D 641 and Undo Process E 651 may be executed prior to Undo Process B 621. Conversely, Undo Process B 621 may be executed prior to Undo Process D 641 and Undo Process E 651. The order execution precedence may be determined by system efficiency or the necessity to completely undo original operations. The undo process commands are executed in an order necessary to ensure that all rollback operations are executed including a non-linear order. A generated hierarchical rollback object such as the object 700 facilitates non-linear execution of the rollback objects. Rollback Object A 610, Rollback Object B 620, Rollback Object C 630, Rollback Object D 640, and Rollback Object E 650 may contain one or more commands or data elements necessary to completely rollback operations related to modification of a business object.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable storage medium storing computer usable program code executable on a computing device to perform the automated rollback of business objects, the operations of the computer program product comprising:
   receiving a non-transactional modification request from a client computing device relating to a business object comprising hierarchically organized objects each comprising a data element and a command, the business object establishing an order of commands without metadata, the modification request comprising a plurality of operations comprising at least one of delete, update, and change requests for data elements that are related by parent-child relationships within the business object;
   generating a rollback procedure comprising a rollback object corresponding to each object, each rollback object comprising an undo process and rollback data;
   conducting the plurality of operations for the data elements specified in the modification request on a data store; and
   hierarchically conducting the rollback procedures using the rollback objects for the data elements in the modification request in response to detecting an execution failure for any of the plurality of operations specified in the modification request.

2. The computer program product of claim 1, wherein each rollback object further comprises logical operations.

3. The computer program product of claim 1, wherein the hierarchically organized objects have non-restricted data relationships.

4. The computer program product of claim 1, wherein the rollback object for a data element is performed according to an execution order, the execution order comprising one of a cascade execution order and a command execution order, the execution order defined by one of a parent command and a child command.

5. The computer program product of claim 1, wherein each undo process comprises commands and undo commands that are executed in a non-linear order.

6. The computer program product of claim 1, wherein generating the rollback procedure includes retrieving data.

7. The computer program product of claim 1, wherein the operations further comprise collecting an activity log of the execution of the plurality of operations specified in the modification request.

8. The computer program product of claim 7, wherein the activity log comprises log entries corresponding to the rollback procedure.

9. An apparatus for automated rollback of business objects, the apparatus comprising:
- a storage device storing machine-readable instructions executable by a processor, the machine-readable instructions comprising:
- an update module configured to receive a non-transactional modification request for a business object comprising hierarchically organized objects each comprising a data element and a command, the business object establishing an order of commands without metadata, the modification request comprising a plurality of operations comprising at least one of delete, update, and change requests for data elements that are related by parent-child relationships within the business object;
- a rollback module configured to generate a rollback procedure comprising a rollback object corresponding to each object, each rollback object comprising an undo process and rollback data;
- the update module further configured to conduct the plurality of operations for the data elements specified in the modification request; and
- the rollback module further configured to hierarchically conduct the rollback procedures using the rollback objects for the data elements in the modification request in response to detecting an execution failure for any of the operations specified in the modification request.

10. The apparatus of claim 9, wherein each rollback object comprises logical operations.

11. The apparatus of claim 9, wherein the rollback object for a data element is performed by one of a cascade execution order and a command execution order defined by one of a parent command and a child command.

12. The apparatus of claim 9, wherein each undo process comprises commands and undo commands that are executed in a non-linear order.

13. The apparatus of claim 9, wherein generating the rollback process includes retrieving data.

14. The apparatus of claim 9, further comprising an activity log configured to record execution of the plurality of operations specified in the modification request.

15. The apparatus of claim 14, wherein the activity log comprises log entries corresponding to the rollback procedure.

16. A system for automated rollback of business objects, the system comprising:
- a datastore configured to store business objects;
- a data server configured to receive a non-transactional modification request for a business object comprising hierarchically organized objects each comprising a data element and a command, the business object establishing an order of commands without metadata, the modification request comprising a plurality of operations comprising at least one of delete, update, and change requests for data elements that are related by parent-child relationships within the business object;
- the data server further configured to generate a rollback procedure comprising a rollback object corresponding to each object, each rollback object comprising an undo process and rollback data;
- the data server further configured to conduct the plurality of operations for the data elements specified in the modification request; and
- the data server further configured to hierarchically conduct the rollback procedure using the rollback objects for the data elements in the modification request in response to detecting an execution failure for any of the plurality of operations specified in the modification request.

17. The system of claim 16 further comprising an application server configured to generate the modification request.

18. The system of claim 16 further comprising an activity log configured to record execution of the plurality of operations specified in the modification request.

19. A method for automated rollback of business objects that are processed by one or more computing devices, the method comprising:
- receiving a modification request for a business object comprising hierarchically organized objects each comprising a data element and a command, the business object establishing an order of commands without metadata, the modification request comprising a plurality of operations comprising at least one of delete, update, and change requests for data elements that are related by parent-child relationships within the business object;
- generating a rollback procedure comprising a rollback object corresponding to each object, each rollback object comprising an undo process and rollback data;
- conducting the plurality of operations for the data elements specified in the modification request; and
- hierarchically conducting the rollback procedures using the rollback objects for the data elements in the modification request in response to detecting an execution failure for any of the plurality of operations specified in the modification request.

* * * * *